US006484205B1

(12) United States Patent
Byford

(10) Patent No.: US 6,484,205 B1
(45) Date of Patent: Nov. 19, 2002

(54) WIRELESS DATA COMMUNICATIONS NETWORK AND A METHOD OF OBTAINING DATA FILES VIA TRANSMITTERS IN SAID NETWORK

(75) Inventor: Derrick John Byford, London (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/107,687

(22) Filed: Jun. 30, 1998

(30) Foreign Application Priority Data

Jul. 16, 1997 (GB) ............................................. 9714852

(51) Int. Cl.[7] ............................................. G06F 13/00
(52) U.S. Cl. ...................................... 709/227; 370/401
(58) Field of Search ................................. 709/227, 218, 709/217, 245; 455/454, 461, 432, 440, 446, 423, 561, 562; 340/825.26, 825.27, 825.44, 825.49, 905, 995; 370/313, 314, 338, 401

(56) References Cited

U.S. PATENT DOCUMENTS

| | | | | |
|---|---|---|---|---|
| 5,479,400 A | * | 12/1995 | Dilworth et al. | 370/331 |
| 5,506,887 A | * | 4/1996 | Emery et al. | 455/414 |
| 5,579,535 A | * | 11/1996 | Orlen et al. | 340/905 |
| 5,608,786 A | * | 3/1997 | Gordon | 709/206 |
| 5,625,877 A | * | 4/1997 | Dunn et al. | 455/454 |
| 5,790,793 A | * | 8/1998 | Higley | 709/218 |
| 5,835,061 A | * | 11/1998 | Stewart | 342/457 |
| 5,862,339 A | * | 1/1999 | Bonnaure et al. | 709/227 |
| 5,881,235 A | * | 3/1999 | Mills | 709/221 |
| 5,905,865 A | * | 5/1999 | Palmer et al. | 455/3.1 |
| 5,960,356 A | * | 9/1999 | Alperovich et al. | 455/432 |
| 5,969,678 A | * | 10/1999 | Stewart | 342/457 |
| 5,974,322 A | * | 10/1999 | Carlsson et al. | 455/446 |
| 6,014,090 A | * | 1/2000 | Rosen et al. | 340/905 |
| 6,070,071 A | * | 5/2000 | Chavez et al. | 455/422 |
| 6,078,823 A | * | 6/2000 | Chavez et al. | 455/562 |
| 6,154,461 A | * | 11/2000 | Sturniolo et al. | 370/338 |
| 6,202,023 B1 | * | 3/2001 | Hanock et al. | 701/201 |
| 6,256,503 B1 | * | 7/2001 | Stephens | 455/414 |
| 6,285,892 B1 | * | 9/2001 | Hulyalkar | 370/311 |

FOREIGN PATENT DOCUMENTS

| | | |
|---|---|---|
| WO | 9634349 | 10/1996 |
| WO | WO97/26750 | 7/1997 |

OTHER PUBLICATIONS

"Personal Digital Radio Service" IBM Technical Disclosure Bulletin vol. 38, No. 8, Aug. 1995, pp. 315/316 and the whole document.

"Mobile Satellite Broadcast System Design" Vehicular Technology Conference, Orlando. May 6–9, 1990 pp. 233–236.

* cited by examiner

Primary Examiner—David Wiley
(74) Attorney, Agent, or Firm—Jerry W. Herndon

(57) ABSTRACT

A data communications network comprises a plurality of geographically spaced wireless transmitters each for transmitting a different network address. At least one mobile user terminal has a wireless receiver for receiving the network addresses transmitted by the transmitters, a wireless transmitter for transmitting requests for delivery of data files from remote locations identified by the network addresses, a wireless receiver for receiving from the remote location the data files identified by the network addresses, and output means for outputting the data files received. Preferably, the network addresses each comprise a Uniform Resource Locator and the data files each comprise a World Wide Web page.

9 Claims, 3 Drawing Sheets

WIRELESS DATA COMMUNICATIONS NETWORK AND A METHOD OF OBTAINING DATA FILES VIA TRANSMITTERS IN SAID NETWORK

TECHNICAL FIELD

The present invention relates to an apparatus and method for accessing a data file via a data communication network.

BACKGROUND OF THE INVENTION

In recent years, there has been explosive growth in the Internet, and in particular of the WorldWide Web (WWW), which is one of the facilities provided via the Internet. The WWW comprises many pages or files of information, distributed across many different servers. Each page is identified by an individual address or "Uniform Resource Locator (URL)". Each URL denotes both a server machine, and a particular file or page on that machine. There may be many pages or URLs resident on a single server.

Typically, to utilise the WWW, a user runs a computer program called a Web browser on a client computer system such as a personal computer. Examples of widely available Web browsers include the "WebExplorer" Web browser provided by International Business Machines Corporation in the OS/2® Operating System software, or the "Navigator" Web browser available from Netscape Communications Corporation. ("OS/2" is a registered trademark of International Business Machines Corporation.) The user interacts with the Web browser to select a particular URL. The interaction causes the browser to send a request for the page or file identified in the selected URL to the server identified in the selected URL. Typically, the server responds to the request by retrieving the requested page, and transmitting the data for that page back to the requesting client. The client-server interaction is usually performed in accordance with a protocol called the Hypertext Transfer Protocol ("HTTP"). The page received by the client is then displayed to the user on a display screen of the client. The client may also cause the server to launch an application, for example to search for WWW pages relating to particular topics.

WWW pages are typically formatted in accordance with a computer programming language known as Hypertext Mark-up Language ("HTML"). Thus a typical WWW page includes text together with embedded formatting commands, referred to as tags, that can be employed to control for example font style, font size, lay-out etc. The Web browser parses the HTML script in order to display the text in accordance with the specified format. In addition, an HTML page also contain a reference, in terms of another URL, to a portion of multimedia data such as an image, video segment, or audio file. The Web Browser responds to such a reference by retrieving and displaying or playing the multimedia data. Alternatively, the multimedia data may reside on its own WWW page, without surrounding HTML text.

Most WWW pages also contain one or more references to other WWW pages, which need not reside on the same server as the original page. Such references may be activated by the user selecting particular locations on the screen, typically by clicking a mouse control button. These references or locations are known as hyperlinks, and are typically flagged by the Web browser in a particular manner. For example, any text associated with a hyperlink may be displayed in a different colour. If a user selects the hyperlinked text, then the referenced page is retrieved and replaces the currently displayed page.

Further information about HTML and the WWW can be found in "World Wide Web and HTML" by Douglas McArthur, p18–26 in Dr Dobbs Journal, December 1994, and in "The HTML SourceBook" by Ian Graham, John Wiley, N.Y., 1995.

SUMMARY OF THE INVENTION

In accordance with the present invention, there is now provided a data communications network comprising: a plurality of geographically spaced wireless transmitters each for transmitting a different network address, and, at least one mobile user terminal having a wireless receiver for receiving the network addresses transmitted by the transmitters, a wireless transmitter for transmitting requests for delivery of data files from remote locations identified by the network addresses, a wireless receiver for receiving from the remote location the data files identified by the network addresses, and output means for outputting the data files received to a user.

Preferably, the network addresses each comprise a Uniform Resource Locator and the data files each comprise a World Wide Web page.

In preferred embodiments of the present invention, the network comprises a plurality of geographically spaced base stations each comprising a receiver for receiving the requests for delivery transmitted by each remote user terminal and for forwarding the requests for delivery to the remote locations identified by the network addresses via the Internet.

In use, each transmitter may continuously transmit the network address. Alteratively, in use, each transmitter may transmit the network address on detection of an interrogation signal generated by each user terminal.

The output means may comprise a display device for displaying the data files received. Furthermore, the output means may comprise an audio output device for generating an audio output as a function of the data files received.

Viewing the present invention from another aspect there is now provided a method of accessing a data file in a data communications network, the method comprising: transmitting, by wireless communications, a different network address from each of a plurality of geographically spaced wireless transmitters; receiving, in a mobile user terminal, by wireless communications, the network addresses transmitted by the transmitters; transmitting from the mobile user terminal, by wireless communications, requests for delivery of data files from remote locations identified by the network addresses; receiving, by wireless communications, in the user terminal, the data files identified by the network addresses from the remote locations; and, outputting, by the user terminal, the data files received.

BRIEF DESCRIPTION OF THE DRAWINGS

Preferred embodiments of the present invention will now be described, by way of example only, with reference to the accompanying drawings, in which.

DETAILED DESCRIPTION OF THE PREFERRED EMBODIMENTS

Figure 1:
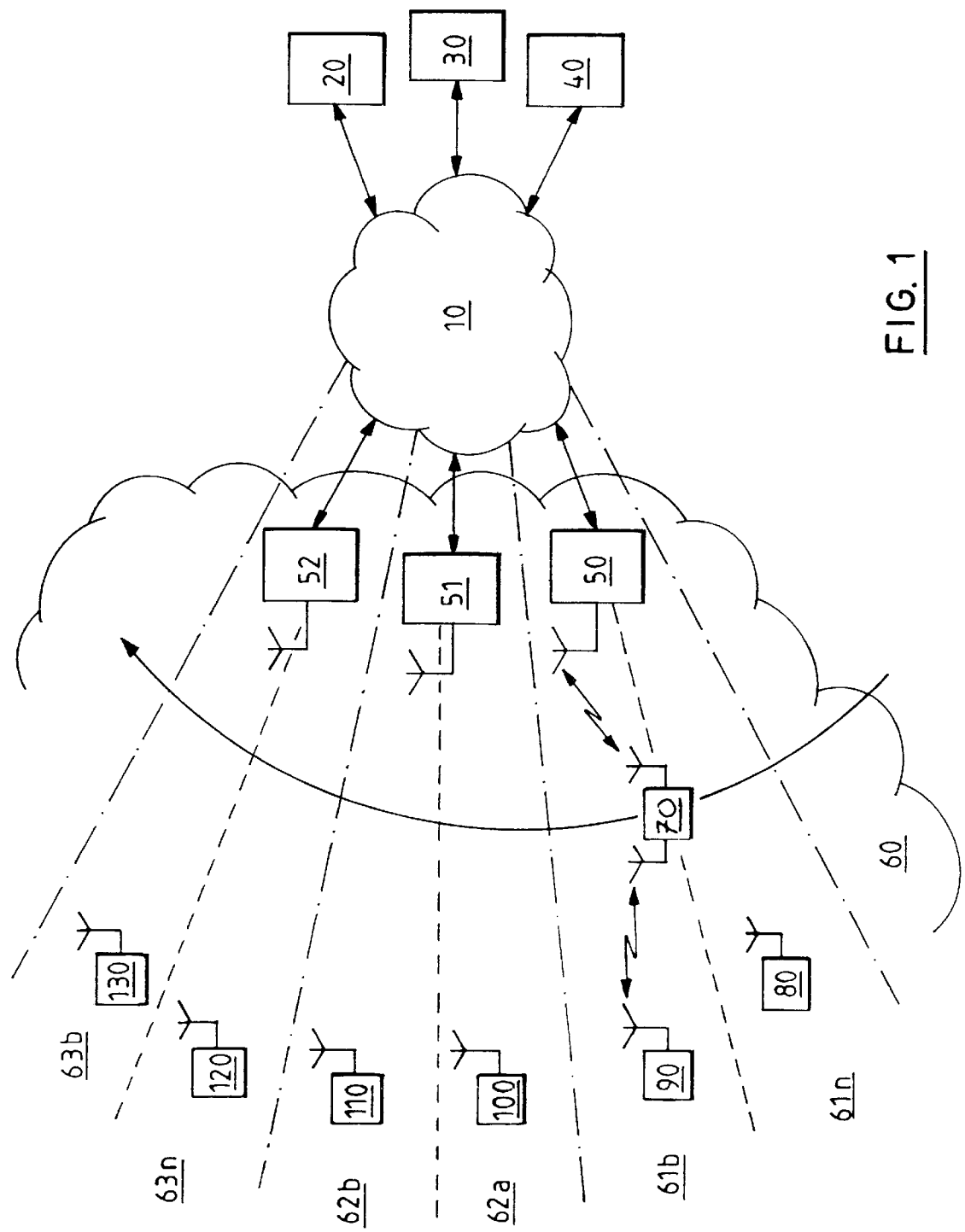
FIG. 1 is a block diagram of a data communications network.

Referring first to FIG. 1, a data communication network embodying the present invention comprises the Internet 10 and a wireless network 60. The wireless network 60 comprises a plurality of geographically divided cells 61–63 (shown as elements 61a and 61b, 62a and 62b, and 63a and 63b) of substantially equal area, a plurality of geographically spaced transmitters 80–130, and a plurality of base station computer systems 50–52. Each base station 50–52 is located in a different cell 61–63. Each cell 61–63 comprises a different group of the transmitters 80–130. Each cell 61–63 is geographically divided into a plurality of sub-cells 61a61b. Each transmitter 80–130 of each group of transmitters 80–130 is located in a different sub-cell 61a–61b. Each base station 50–52 of the wireless network 60 is connected to the Internet 10. Also connected to the Internet are a plurality of WWW server computer systems 2040. The wireless network 60 further comprises a user terminal 70.

Figure 2:
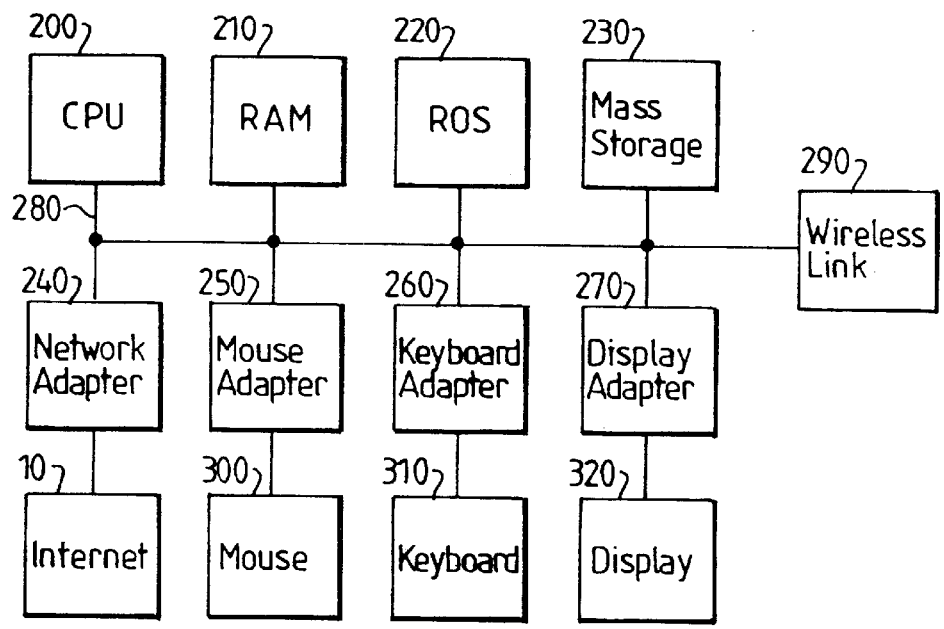
FIG. 2 is a block diagram of a base station server computer system of the data communications network.

Referring now to FIG. 2, each base station 50–52 comprises a random access memory (RAM) 210, a read only storage (ROS) or memory (ROM) 220, a central processing unit (CPU) 200, a mass storage device 230 comprising one or more large capacity magnetic disks or similar data recording media, a network adapter 240, a keyboard adapter 260, a pointing device adapter 250, a display adapter 270, and a radio frequency (RF) transceiver 290, all interconnected via a bus architecture 280. A keyboard 310 is coupled to the bus architecture 280 via the keyboard adapter 260. Similarly, a pointing device 300, such as a mouse, touch screen, tablet, tracker ball or the like, is coupled to the bus architecture 280 via the pointing device adapter 250. Equally, a display output device 320, such as a cathode ray tube (CRT) display, liquid crystal display (LCD) panel, or the like, is coupled to the bus architecture 280 via the display adapter 270. The RF transceiver 290 has sufficient range for RF communications with the user terminal 70 only when the user terminal 70 is located within the same cell 61–63.

Basic input output system (BIOS) software is stored in the ROM 220 for enabling data communications between the CPU 200, mass storage 230, RAM 210, ROM 220, adapters 240–270, and the wireless data link 290 via the bus architecture 280. Stored on the mass storage device 230 is operating system software and application software. The operating system software cooperates with the BIOS software in permitting control of the base station 50 by the application software. The application software includes communications software for enabling communication of data between the WWW servers 2040 and the base stations 50–52 via the network adapter 240 and the Internet 10, and between the user terminal 70 and the base stations 5052 via the wireless link 290.

Figure 3:
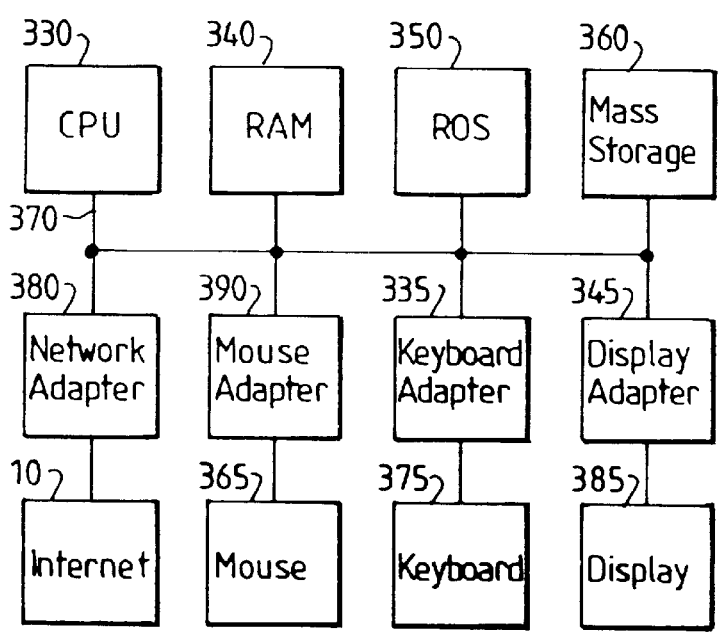
FIG. 3 is a block diagram of a WWW server computer system as the data communications network.

Referring now to FIG. 3, each WWW server 20–40 comprises a RAM 340, a ROM 350, a CPU 330, a mass storage device 360 comprising one or more large capacity magnetic disks or similar data recording media, a network adapter 380, a keyboard adapter 335, a pointing device adapter 390, and a display adapter 345 all interconnected via a bus architecture 370. A keyboard 375 is coupled to the bus architecture 370 via the keyboard adapter 335. Similarly, a pointing device 365, such as a mouse, touch screen, tablet, tracker ball or the like, is coupled to the bus architecture 370 via the pointing device adapter 390. Equally, a display output device 385, such as a CRT display, LCD panel, or the like, is coupled to the bus architecture 370 via the display adapter 345.

BIOS software is stored in the ROM 350 for enabling data communications between the CPU 330, mass storage 360, RAM 340, ROM 350, and adapters 380, 390, 335, and 345 via the bus architecture 370. Stored on the mass storage device 360 is operating system software and application software. The operating system software cooperates with the BIOS software in permitting control of the server 20–40 by the application software. The application software includes communications software for enabling communication of data between the server 20–40 and the base stations 50–52 via the network adapter 380 and the Internet 10. Also stored on the mass storage device 360 is a WWW page. 360, RAM 340, ROM 350, and adaptors 380, 390, 335, and 345 via the bus architecture 370. Stored on the mass storage device 360 is operating system software and application software. The operating system software cooperates with the BIOS software in permitting control of the server 20–40 by the application software. The application software includes communications software for enabling communication of data between the server 20–40 and the base stations 50–52 via the network adapter 380 and the Internet 10. Also stored on the mass,storage device 360 is a WWW page.

Figure 4:
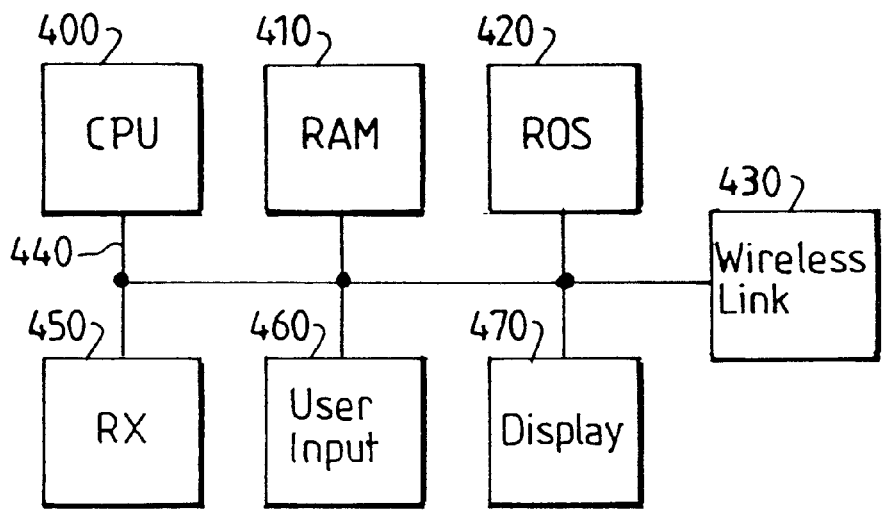
FIG. 4 is a block diagram of a user terminal of the data communications network; and, FIG. 5 is a block diagram of a tagging device of the data communications network.

Referring now to FIG. 4, the user terminal 70 comprises a CPU 400, a RAM 410, a ROM 420, a user input 460, a display 470, an RF receiver 450, and an RF transceiver 430 all interconnected by a bus architecture 440. The RF transceiver 430 is tuned for RF communications with the base stations 50–52. The RF transceiver 430 only has sufficient range for RF communications with the RF transceiver 290 of the base station 50–52 in the same cell 61–63 as the user terminal 70. The RF receiver 450 is tuned to receive RF signals from the transmitters 80–130. The RF receiver 450 has sufficient sensitivity to receive RF signals from the transmitter located in the same sub-cell 61a–61b as the user terminal 70. The display 470 comprises a flat panel display such as an LCD panel and the user input 460 comprises a touch sensitive screen overlaying the flat panel, display for actuation by a stylus, finger or the like. In other embodiments of the present invention, the user input 460 may comprise a different form of input transducer, such as a keyboard for example.

BIOS software is stored in the ROM 420 for enabling data communications between the CPU 400, RAM 410, ROM 420, display 470, user input 460, receiver 450, and transceiver 430 via the bus architecture 440. Also stored in the ROM 420 is operating system software and application software. The operating system software cooperates with the BIOS software in permitting control of the user terminal 70 by the application software. The application software comprises a web browser for accessing, via the transceiver 430, the base stations 50–52, and the Internet 10, WWW pages stored on WWW servers 20–40 and for displaying WWW pages read from the WWW servers 2040 on the display screen 470. The application software also includes communication software for reading, via the receiver 450, data from the transmitters 80–130 and for supplying, via the transceiver 430, data read from the transmitters 80–130 to the base stations 50–52.

Figure 5:
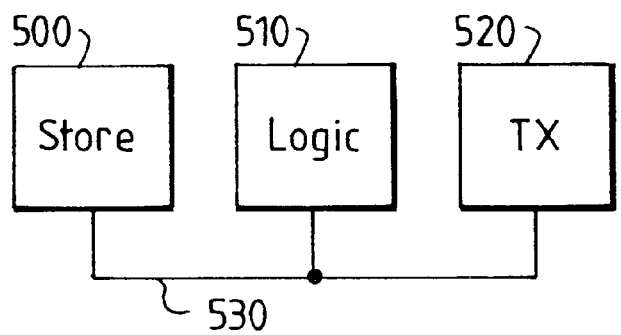

Referring now to FIG. 5, each of transmitters 80–130 comprises a data store 500,. control logic 510 and an RF transmitter 520 all interconnected by a bus architecture 530. The data store 500 contains a URL identifying one of the WWW pages stored on WWW servers 20–40. The RF transmitter 520 is tuned to transmit RF signals for reception by the receiver 450 of the user terminal 70. The RF signals transmitted by the RF transmitter 520 have sufficient power to enable reception by the receiver 450 of the user terminal 70 when the user terminal 70 is located within the same sub-cell 61a–61b. The data store 500 of each of the transmitters 80–130 contains a different URL.

In operation, the RF transmitter 520 of each of the transmitters 80–130 continuously transmits, under control of the logic 510, an RF signal containing the URL stored in the data store 500. When the user terminal 70 passes into a sub cell, 61a say, the receiver 450 detects the RF signal transmitted by the transmitter 80 located in the sub-cell 61a. The receiver 450 thus receives the URL stored in the data store 500 of the transmitter 80. The CPU 400 activates the web browser and inputs the received URL. The web browser instructs the CPU 400 to communicate, via the transceiver 430, the received URL to the base station 50 located in the same cell 61. The wireless data link 290 of the base station 50 receives the URL from the user terminal 70. The base station 50 retrieves the WWW page specified by the received URL from the associated WWW server 20 to 40 via the Internet 10. The WWW page obtained from the Internet 10 is sent by the base station 50 to the user terminal 70 via the transceiver 290. The user terminal 70 then displays the received WWW page to the user of the display screen 470. In some embodiments of the present invention, the user terminal may comprise an audio output device for generating an audio output as a function of the received WWW page.

When the user terminal 70 passes from, say, sub-cell 61a to sub-cell 61b, the receiver 450 begins detecting an RF signal containing a new URL. The new URL is the URL stored in the transmitter 90 located in sub-cell 61b. The CPU 400 inputs the received new URL to the web browser. The web browser instructs the CPU 400 to communicate, via the transceiver 430, the received new URL to the base station 50 located in the same cell 61. The wireless data link 290 of the base station 50 receives the new URL from the user terminal 70. The base station 50 retrieves the new WWW page specified by the received new URL from the associated WWW server 20 to 40 via the Internet 10. The new WWW page obtained from the Internet 10 is sent by the base station 50 to the user terminal 70 via the transceiver 290. The user terminal 70 then displays the received new WWW page to the user of the display screen 470.

When the user terminal 70 passes from, say, sub-cell 61b to sub-cell 62a, the receiver 450 begins detecting an RF signal containing another new URL. The new URL is the URL stored in the transmitter 100 located in sub-cell 62a. The CPU 400 again inputs the received new URL to the web browser. The web browser instructs the CPU 400 to communicate, via the transceiver 430, the received new URL to the base station 51 located in the same cell 62. The wireless data link 290 of the base station 51 receives the new URL from the user terminal 70. The base station 51 retrieves the new WWW page specified by the received new URL from the associated WWW server 20 to 40 via the Internet 10. The new WWW page obtained from the Internet 10 is sent by the base station 50 to the user terminal 70 via the transceiver 290. The user terminal 70 then displays the received new WWW page to the user of the display screen 470.

In a preferred application of the embodiment of the present invention hereinbefore described, the user terminal 70 is mounted within a vehicle such as a car, motorcycle, or lorry (i.e. truck), and the transmitters 80–130 are located at intervals throughout a road transportation system. Each of the WWW pages stored on servers 2040 contains travel information relating to the geographical area covered by the sub-cell of the wireless network 60 containing the transmitter 80–130 in which the corresponding URL is stored. Thus, as the vehicle passes into one of a plurality of sub-cells, the corresponding WWW page containing information relevant to the associated geographical area is automatically downloaded into the web browser of the user terminal 70. The information may include one or more of the following: traffic reports; travel directions; weather conditions; parking availability; and, local attractions such as museums, zoos, art galleries and the like. It will be appreciated that a plurality of vehicles travelling within the same transportation system may each be fitted with examples of the user terminal 70 hereinbefore described.

In the preferred embodiment of the present invention hereinbefore described, each transmitter 80–130 continuously transmits the URL stored in it. However, in other embodiments of the present invention, each transmitter 80–130 may instead transmit the URL on command. For example, in some embodiments of the present invention, each transmitter 80–130 may transmit the URL on detection of an RF interrogation signal transmitted by the user terminal 70 when it passes into the relevant sub-cell. In other embodiments of the present invention, the interrogation signal activating each of the transmitters 80–130 may be generated independently of the user terminal 70. For example, the interrogation signal may be generated by a separate RF emitter mounted remotely from the user terminal 70 in the same vehicle. The interrogation signal may be generated automatically as a function of time or distance travelled, or both. Alternatively, the interrogation signal may be selectively generated according to instructions from the user entered via user input 460 for example. It will be appreciated that, in some embodiments of the present invention, the transmitter 80–130 may be activated by a pressure switch mounted in the carriage way (i.e. road) on which a vehicle carrying the user terminal 70 travels.

In some embodiments of the present invention, the sub-cells may cover substantially equal geographical areas. However, in particularly preferred embodiments of the present invention, the sub-cells cover geographical areas of different sizes, with a greater density of transmitters 80–130 disposed in more densely populated areas where more frequent updates of detailed travel information are desirable.

It will be appreciated that the embodiments of the present invention enable information in general, and travel information in particular, to be supplied to mobile users quickly and efficiently. Furthermore, the servers enable the information to be updated conveniently for immediate supply to remote users.

I claim:

1. A data communications network comprising: a plurality of geographically spaced wireless transmitters each for transmitting a different network address; and, at least one mobile user terminal having a wireless receiver for receiving selectively the network addresses transmitted by the transmitters, the selective reception of an address depending on proximity of the mobile user terminal to individual ones of the spaced wireless transmitters, a wireless transmitter for transmitting requests for delivery of data files from remote locations identified by the network addresses, a wireless receiver for receiving from the remote locations the data files identified by the network addresses, and output means for outputting the data files received to a user.

2. A network as claimed in claim 1, wherein the network addresses each comprise a Uniform Resource Locator and the data files each comprise a World Wide Web page.

3. A network as chimed in claim 1, further comprising a plurality of geographically spaced base stations each comprising a receiver for receiving the requests for delivery transmitted by each mobile user terminal and for forwarding the requests for delivery to the remote locations identified by the network addresses via a network known as "the Internet".

4. A network as claimed in claim 3, wherein, in use, each geographically spaced wireless transmitter continuously transmits the network address.

5. A network as claimed in claim 3, wherein, in use, each geographically spaced wireless transmitter transmits the network address on detection of an interrogation signal generated by each user terminal.

6. A network as claimed in claim 1 wherein the output means comprises a display device for displaying the data files received.

7. A network as claimed in claim 1 wherein the output means comprises an audio output device for generating an audio output as a function of the data files received.

8. A method of accessing a data file in a data communications network, the method comprising: transmitting, by wireless communications, a different network address from each of a plurality of geographically spaced wireless transmitters; receiving selectively, in a mobile user terminal, by wireless communications, the network addresses transmitted by the transmitters, the selective reception of an address depending on proximity of the mobile user terminal to individual ones of the spaced wireless transmitters; transmitting from the mobile user terminal, by wireless communications, requests for delivery of data files from remote locations identified by the network addresses; receiving, by wireless communications, in the user terminal, the data files identified by the network addresses from the remote locations; and, outputting, by the user terminal, the data files received.

9. A method as claimed in claim 8, wherein the network addresses each comprise a Uniform Resource Locator and the data files each comprise a World Wide Web page.

* * * * *

UNITED STATES PATENT AND TRADEMARK OFFICE
CERTIFICATE OF CORRECTION

PATENT NO.    : 6,484,205 B1
DATED         : November 19, 2002
INVENTOR(S)   : Derrick John Byford It is certified that error appears in the above-identified patent and that said Letters Patent is hereby corrected as shown below:

Column 6,
Line 66, delete "chimed" and insert -- claimed --

Signed and Sealed this

Twenty-fifth Day of March, 2003

JAMES E. ROGAN
*Director of the United States Patent and Trademark Office*